Sept. 29, 1931.  V. E. PIERRET  1,825,124

EMERGENCY VALVE OPERATING MECHANISM

Filed Oct. 16, 1924  2 Sheets-Sheet 1

INVENTOR.
Victor E. Pierret
BY *Westall and Wallace*
ATTORNEYS.

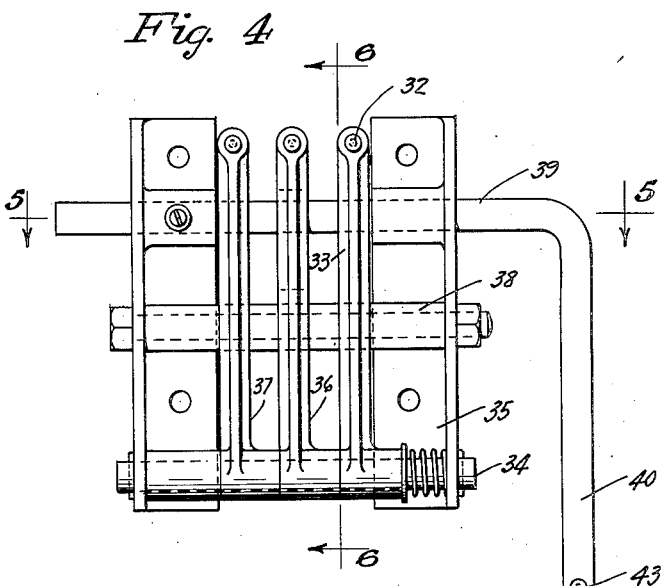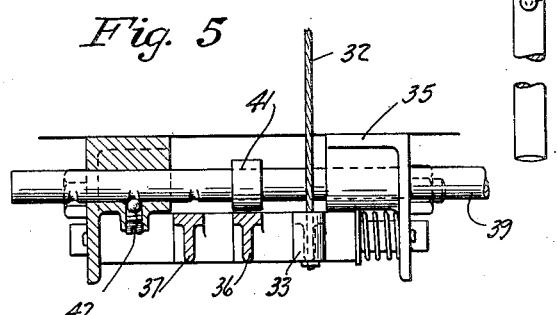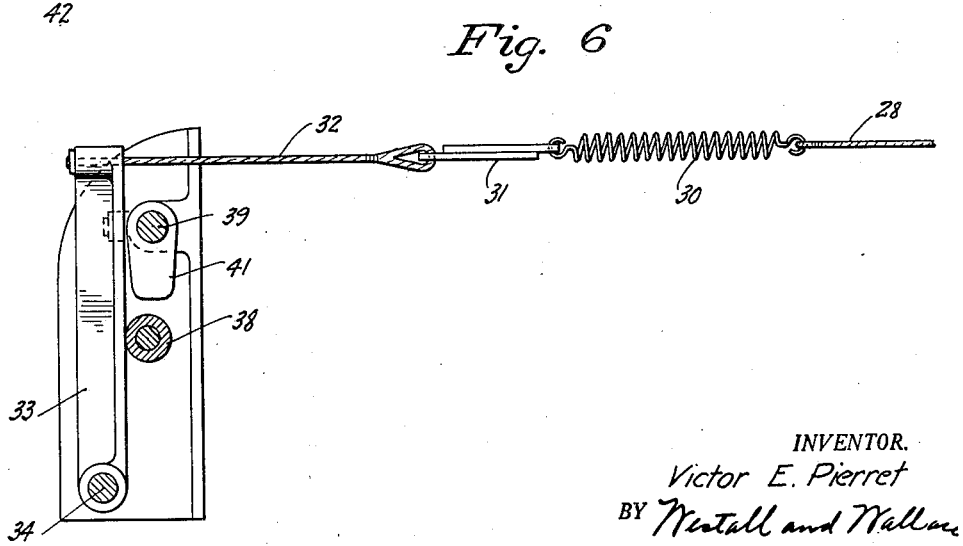

Patented Sept. 29, 1931

1,825,124

UNITED STATES PATENT OFFICE

VICTOR E. PIERRET, OF LOS ANGELES, CALIFORNIA

EMERGENCY VALVE OPERATING MECHANISM

Application filed October 16, 1924. Serial No. 743,945.

This invention relates to apparatus for controlling the outflow of liquids from tank compartments. More especially, the present invention is adapted for tank vehicles, such as tank wagons and tank trucks used for transporting oil and the like.

In apparatus of the character above referred to, the outflow or delivery piping and conduits often become broken or damaged, in which event, it becomes advantageous to be able to control the outflow to prevent waste of the liquid and danger. Tank vehicles are commonly provided with a plurality of compartments. It becomes advantageous to provide a valve for each compartment to control the outflow therefrom and to selectively operate the valves from a common valve operating mechanism, the valves being normally closed. The primary object of this invention is to provide a structure which will satisfy the conditions above mentioned.

Another object of this invention is to provide thermal means for releasing a valve so as to permit it to close, in the event of fire. In addition to the broader objects of this invention, there are certain details of design, whereby a simple, economical, and easily manipulated structure is obtained.

Figure 1:
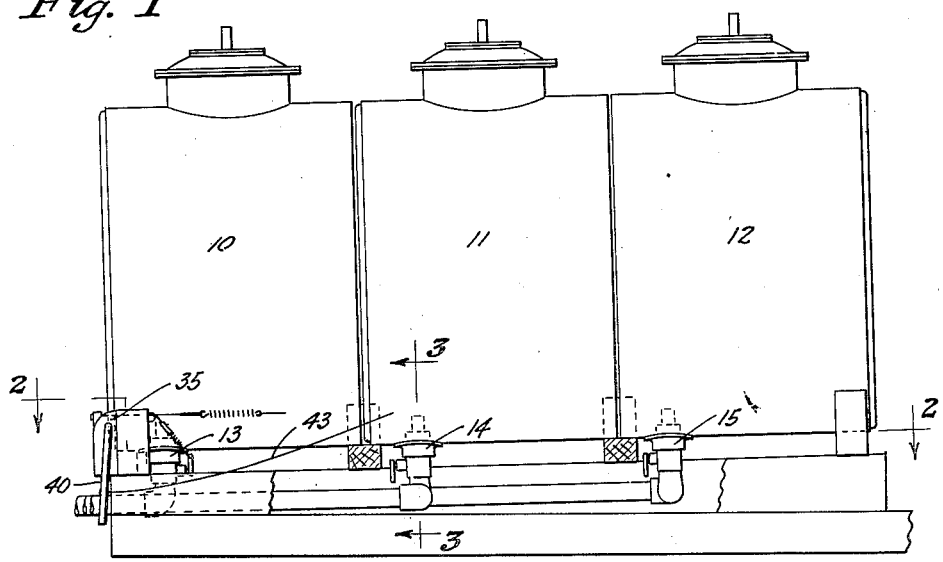
Figure 2:
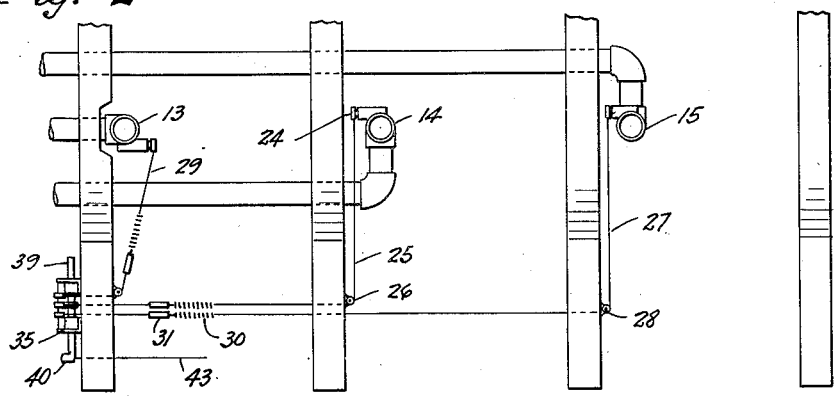
Figure 3:
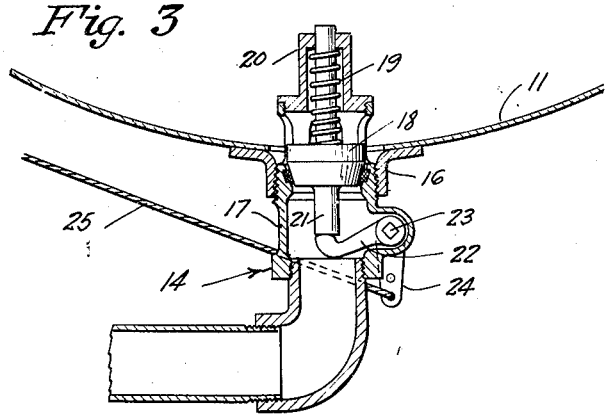

These objects together with other objects and corresponding accomplishments are obtained by means of the embodiment of my invention illustrated in the accompanying drawings, in which:

Fig. 1 is a side elevation showing three tank compartments mounted upon a frame, a fragment of the latter being shown, the apparatus being equipped with my improved operating mechanism; Fig. 2 is a sectional view of the structure shown in Fig. 1 as seen on the line 2—2 of Fig. 1; Fig. 3 is a fragmentary section as seen on the line 3—3 of Fig. 1 on an enlarged scale; Fig. 4 is a face view of the operating unit; Fig. 5 is a section as seen on the line 5—5 of Fig. 4; and Fig. 6 is a section as seen on the line 6—6 of Fig. 4.

Referring more particularly to the drawings, the tank is shown as composed of three compartments, 10, 11, and 12. These compartments are similar in construction. At the bottom of the compartments are outlets 13, 14, and 15. The outlets and their associated valve structures are the same and it will be sufficient to describe one. Outlet 14, as best shown in Fig. 3, comprises a pipe flange 16, in which is mounted a valve cage 17. Mounted in the valve cage is a lift valve 18 having a stem, about which is mounted a compression spring 19 abutting the head 20 so that the spring tends to seat the valve. Depending from the valve disk is a post 21 arranged to be engaged by a finger 22 secured to a shaft 23 which is pivotally mounted in the valve casing. Secured to the shaft 23 and on the outside of the valve casing is a crank 24. A cable 25 is attached to the crank and is guided around a pulley 26. The outlet 15 being of a similar construction has a control cable 27 passed around a pulley 28, and similarly outlet 13 is provided with a control cable 29. Connected to each control cable is a spring to maintain tension in the cable. Referring more particularly to Fig. 6, a tension spring 30 is shown connected to control cable 28. Each control cable line has a thermal release 31 comprising two suitable strips of metal sweated together and so arranged that upon being heated to a given temperature, the joint between the strips will open, thereby breaking the control line and releasing the tension therein. The other end of the terminal member is connected by a length of cable 32 to a finger 33 pivotally mounted upon a shaft 34 mounted in a frame 35. The frame consists of two angle members mounted upon the rear tank compartment. Also mounted upon the shaft 34 are similar fingers 36 and 37, each finger being connected to a control cable. Extending across the frame is a stop bar 38 to limit the movement of the fingers. Pivotally mounted in the frame is a cam shaft 39 having a handle 40 for convenient operation of the same. Fixed to the shaft 39 is a cam 41 having a high portion in line with the handle 40. When the handle is down, the high portion is down and the cam is out of engagement with any of the fingers. When the handle 40 is swung outwardly into a horizontal plane, the high portion 41 is moved into engagement with a finger, swinging the latter outwardly thereby pulling upon the control line of that finger and operating the corresponding outlet valve so as to lift the same. The shaft 39 is slidable longitudinally so that the cam 41 may be brought into registration with any of the fingers selected. In order to indicate correct registration of the cam with each of the fingers, there are three recesses in the shaft arranged to be engaged by a detent 42. In order that the driver at the front of the vehicle may close any valve which has been opened, a line 43 attached to the arm 40 and extending to the front of the machine is provided.

It is obvious that when the handle 40 is in vertical position and depending downwardly, all of the valves will be closed. To open a particular valve, the shaft 39 is moved so that the cam 41 is in registration with the finger controlling the particular valve desired. The handle 40 is then swung outwardly, the cam 41 moving the finger 33 outwardly, pulling upon its control line and thereby opening the valve. The high portion of the cam is flattened so that the tension upon the line and finger will cause the finger to remain open. In the event of fire, the thermal joints are opened by the heat and the control valves closed, thereby shutting off the flow of oil.

What I claim is:

1. The combination with a plurality of tank compartments having outlet valves normally closed, a control unit comprising a corresponding number of independent fingers, linkage connecting each finger with a valve, means to maintain tension in said linkage, thermal joints, one for each valve, disposed in said linkage, and a longitudinally movable shaft having a cam registerable with any selected finger, said cam being shaped so as to swing a finger when said shaft is turned.

2. A control unit comprising a frame, a finger shaft mounted therein, a plurality of fingers pivotally mounted upon said shaft side by side so as to be moved independently, a longitudinally slidable shaft journalled in said frame, said shaft having a cam for registration with any selected finger, said cam having a high spot so as to swing a finger when said shaft is turned, a stop bar mounted in said frame so as to limit the swinging of said fingers in one direction and spring means tending to maintain said fingers against said bar.

3. In combination with a vehicle, a series of tanks carried by said vehicle, a self closing discharge valve associated at and with each tank and a single cam operatively connected to said valves, said cam being disposed remote from said valve adapted to selectively open and retain in open position any one of said valves.

4. In combination with a vehicle, a series of tanks carried by said vehicle, an outlet pipe extending from the bottom of each of said tanks to the rear of said vehicle, self-closing valves in each of said pipes and means for opening and keeping open, one valve only at one time, said means being releasable from two positions, one of said positions being removed from the other, said means comprising a series of fingers, one for each valve and connected to a valve, a cam adjustable to engage any one of said fingers and swing the same to open a valve.

5. In combination with a vehicle, a series of tanks carried by said vehicle, an outlet pipe extending from the bottom of each of said tanks to the rear of said vehicle, self-closing valves in each of said pipes and means for opening and keeping open one valve only at one time, said means being releasable from two positions, one of said positions being removed from the other, said means comprising a series of fingers, one for each valve and connected to a valve, a cam adjustable to engage any one of said fingers and swing the latter to open a valve, and a laterally slidable shaft on which said cam is fixedly mounted.

6. In combination with a vehicle, a series of tanks carried by said vehicle, an outlet pipe extending from the bottom of each of said tanks to the rear of said vehicle, self-closing valves in each of said pipes and means for opening and keeping open one valve only at one time, said means being releasable from two positions, one of said positions being removed from the other, said means comprising a series of fingers, one for each valve and connected to a valve, a cam adjustable to engage any one of said fingers and swing the latter to open a valve and a laterally slidable shaft on which said cam is fixedly mounted, said shaft having a crank.

7. In combination with a vehicle, a series of tanks carried by said vehicle, an outlet pipe extending from the bottom of each of said tanks to the rear of said vehicle, self-closing valves in each of said pipes and means for opening and keeping open one valve only at one time, said means being releasable from two positions, one of said positions being removed from the other, said means comprising a series of fingers, one for each valve and connected to a valve, a cam adjustable to engage any one of said levers and swing the same to open a valve and a laterally slidable shaft on which said cam is fixedly mounted, said shaft having a crank, said means being positioned at the rear of said vehicle.

8. In combination with a vehicle, a series of tanks carried by said vehicle, an outlet pipe extending from the bottom of each of said tanks to the rear of said vehicle, self-closing valves in each of said pipes and means for opening and keeping open one valve only at one time, said means being releasable from two positions, one of said positions being removed from the other, said means comprising a series of fingers, one for each valve and connected to a valve, a cam adjustable to engage any one of said fingers and swing the same to open a valve, and means for limiting the movement of the cam.

9. In combination with a vehicle, a series of tanks carried by said vehicle, each having a separate outlet, a valve for controlling flow through each outlet and means for opening and keeping open one valve only at a time including a cam, a member operatively connected to the stem of said valve at a distance from the valve seat, and adapted to be engaged and moved by the cam, said means being releasable from two positions remote from each other.

10. In combination with a vehicle, a series of tanks carried by said vehicle, each having a separate outlet, a valve for controlling flow through each outlet, means for opening and keeping open one valve only at a time including a cam, a member operatively connected to the stem of said valve and adapted to be moved by the cam to open the valve and to be held by the cam in such position, said means being releasable from two positions, one remote from the other, and means responsive to temperature for effecting the release of the opened valve.

11. In combination with a vehicle, a series of tanks carried by said vehicle, an outlet pipe leading from each tank to the rear of the vehicle, a self-closing valve arranged to control flow from each tank through its associated outlet pipe, and means for opening and keeping open one valve only at a time, including a cam, a member operatively connected to the stem of said valve at a point remote from the valve seat adapted to be engaged and moved by the cam, a shaft on which the cam is mounted arranged for lengthwise and rocking movement, and means for bringing about a movement of the shaft resulting in the release of said opening means and operable from two positions, one remote from the other.

In witness that I claim the foregoing I have hereunto subscribed my name this 8th day of October, 1924.

VICTOR E. PIERRET.